United States Patent [19]

Baker

[11] Patent Number: 5,622,228
[45] Date of Patent: Apr. 22, 1997

[54] TOOL FOR MAKING RAISED BEDS

[76] Inventor: Thomas M. Baker, 142 Rock Hill La., Elizabethtown, Ky. 42701

[21] Appl. No.: 493,905

[22] Filed: Jun. 23, 1995

[51] Int. Cl.[6] .................................................. A01B 13/02
[52] U.S. Cl. ........................ 172/180; 172/200; 172/574; 172/600; 172/684.5; 172/701
[58] Field of Search ..................... 172/701, 200, 172/199, 197, 195, 175, 174, 180, 181, 182, 684.5, 168, 574, 604, 600; 111/138; 405/36; 37/142.5, 378

[56] References Cited

U.S. PATENT DOCUMENTS

| Re. 25,439 | 9/1963 | Mostrong | 111/138 X |
|---|---|---|---|
| 666,494 | 1/1901 | Carpenter et al. | 172/199 X |
| 1,079,850 | 11/1913 | Fielder | 172/195 X |
| 1,225,378 | 5/1917 | Walker . | |
| 1,396,037 | 11/1921 | Garst . | |
| 1,426,665 | 8/1922 | Novo | 172/600 |
| 1,881,358 | 10/1932 | Hymans | 172/200 X |
| 1,954,783 | 4/1934 | Bohmker | 172/604 X |
| 2,259,828 | 10/1941 | Mowers | 172/200 X |
| 2,629,351 | 2/1953 | Wenger . | |
| 2,673,434 | 3/1954 | Babinchak | 172/199 X |
| 2,729,157 | 1/1956 | Webb, Jr. . | |
| 3,090,448 | 5/1963 | Hotchkiss, Jr. | 172/168 X |
| 3,128,833 | 4/1964 | Johnson et al. . | |
| 3,252,522 | 5/1966 | Taylor . | |
| 4,047,574 | 9/1977 | Foreman | 172/200 X |
| 4,072,197 | 2/1978 | Boyd-Dunlop | 172/574 X |
| 4,257,487 | 3/1981 | Brown | 172/200 X |
| 4,438,819 | 3/1984 | Ryals . | |
| 4,595,064 | 6/1986 | Anderson | 172/200 X |
| 4,601,347 | 7/1986 | Parish | 172/200 X |
| 4,618,004 | 10/1986 | Howard | 172/701 X |
| 5,103,624 | 4/1992 | Marshall . | |
| 5,285,854 | 2/1994 | Thacker et al. | 172/195 X |
| 5,318,134 | 6/1994 | Jensen | 172/195 X |

FOREIGN PATENT DOCUMENTS

| 2403006 | 4/1979 | France | 172/199 |
|---|---|---|---|
| 2429545 | 1/1980 | France | 172/701 |
| 380261 | 7/1973 | U.S.S.R. | 172/200 |

*Primary Examiner*—Dave W. Arola
*Assistant Examiner*—Christopher J. Novosad
*Attorney, Agent, or Firm*—Wheat, Camoriano, Smith & Beres, PLC

[57] ABSTRACT

A tool forms and shapes raised beds efficiently by forming and shaping a mound between the tractor tires and forming half mounds to the left and right of the tractor on one pass. The tool includes forward and rear disks mounted at different angles, so that one disk throws dirt to one side and the other disk throws dirt to the other side.

11 Claims, 7 Drawing Sheets

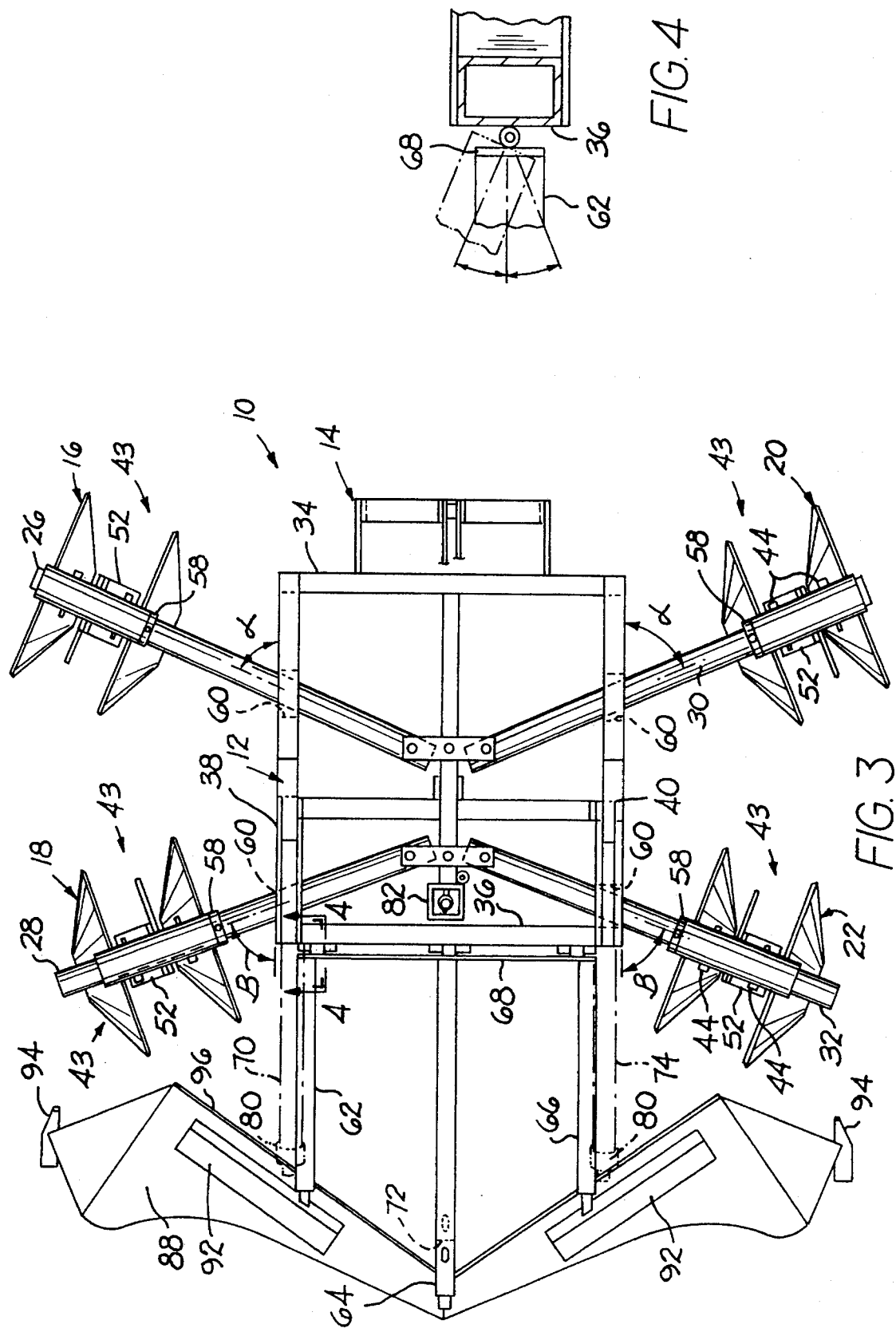

5,622,228

TOOL FOR MAKING RAISED BEDS

BACKGROUND OF INVENTION

The present invention relates to farm implements, and, in particular, to a tool for making raised beds.

Raised beds are used for many different types of crops, particularly crops which require good drainage, such as ginseng. In order to make raised beds for large-scale farming, a farmer typically has to make several passes over the same ground, tilling the soil up, mounding the soil, and then shaping the raised bed mounds. Typically, this requires the use of different tools, so the farmer has to go over the entire field with one tool, change tools, and then go over the entire field with another tool. This is very time consuming and labor intensive.

Typically, the resulting mound formed with existing tools is not ideally shaped. The ideal shape for a crop like ginseng is a crowned mound, so that rain will tend to run off the mound. Instead, typical prior art tools form a mound with a trough in the top, which tends to catch and hold water. This is not preferred for crops like ginseng.

SUMMARY OF THE INVENTION

The present invention provides a farm implement which provides tremendous savings of time and labor required for forming raised beds. Whereas, with prior art tools, it usually takes six to eight hours to prepare one acre of raised beds, with the present invention, one acre of raised beds can be prepared in 1.5 hours.

The present invention provides a tool which makes a half-mound to the left, a half-mound to the right, and a full mound in the center of the tool, and which shapes the center mound in the same pass.

The present invention can be adjusted width-wise, and it can be adjusted to make a crowned raised bed or a raised bed with an indentation in the top.

BRIEF DESCRIPTION OF THE DRAWINGS

FIG. 3 is a top view thereof;

FIG. 4 is a broken-away sectional view taken along the section 4—4 of FIG. 3;

FIG. 7 is a front sectional view of one pair of disks of the tool of. FIG. 1;

DESCRIPTION OF THE PREFERRED EMBODIMENT

Figure 1:
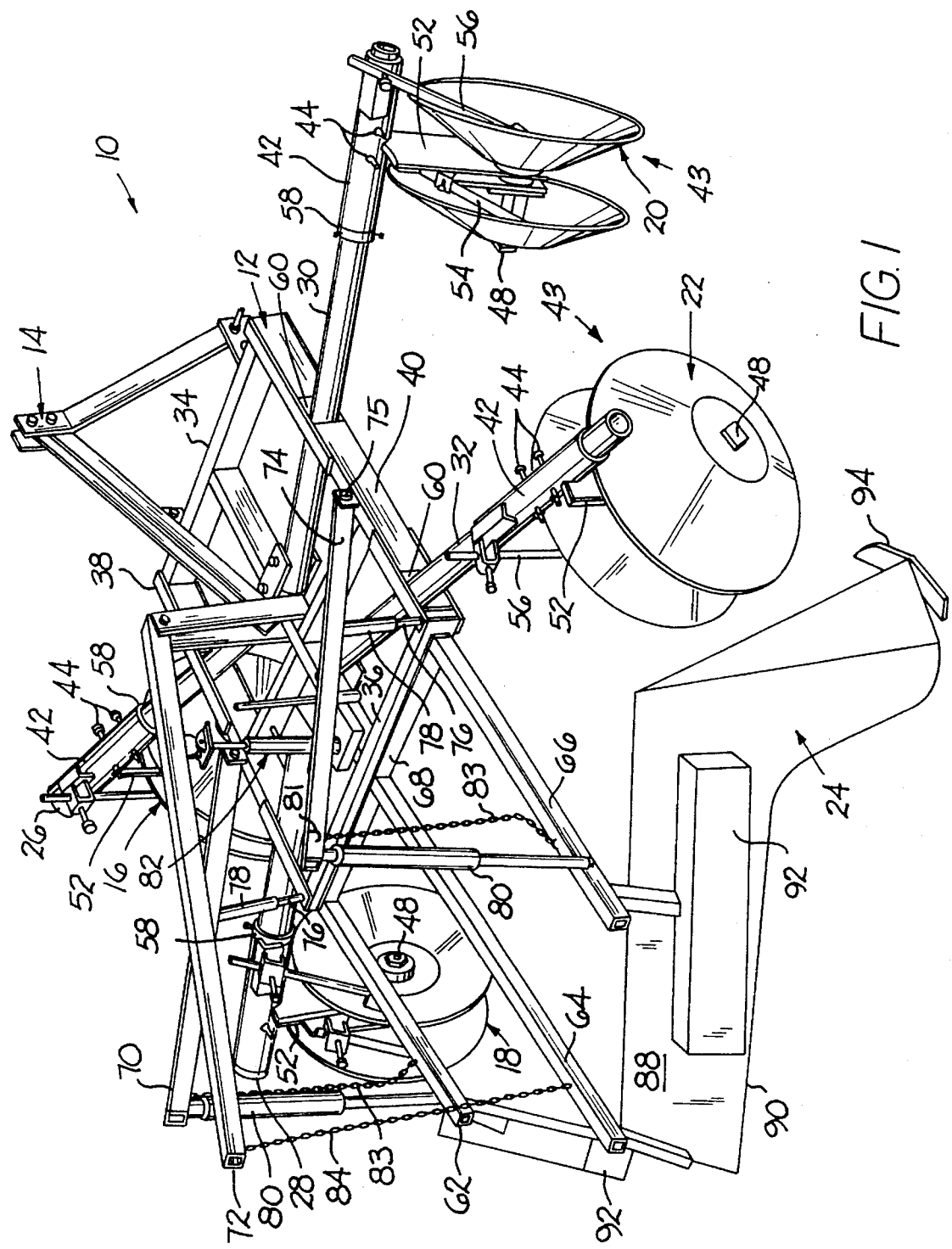
FIG. 1 is a perspective view of a tool made in accordance with the present invention.

FIG. 1 is a rear perspective view of a preferred embodiment of the present invention. The tool 10 includes a frame 12, which includes a hitch 14, allowing the tool 10 to be pulled behind a tractor. Mounted on the frame 12 are a pair of left forward disks 16, a pair of left rear disks 18, a pair of right forward disks 20, and a pair of right rear disks 22. A shaper 24 is mounted on the frame 12 behind the disks.

Each pair of disks 16, 18, 20, 22 is mounted on an arm 26, 28, 30, 32, respectively, and each of the arms is mounted on the frame 12. The frame 12 has a front 34, back 36, left side 38, and right side 40.

Each arm extends at an angle to the frame. These angles can be seen best in FIG. 3. The left forward arm 26 projects from the left side of the frame at a forward angle alpha. The left rear arm 28 projects from the left side of the frame 12 at a rearward angle beta. The right forward arm 30 projects from the right side of the frame 12 at a forward angle alpha, and the right rear arm 32 projects from the right side of the frame 12 at a rear angle beta. The angles alpha and beta both are preferably approximately 45°.

Figure 5:
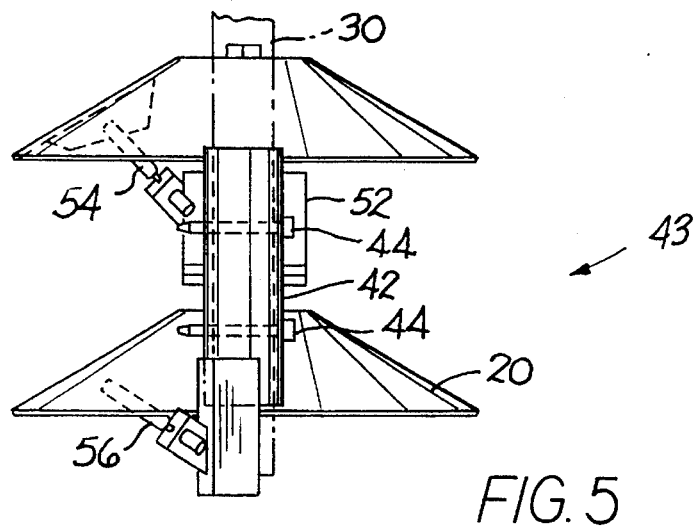
FIG. 5 is a top view of one pair of disks of the tool of FIG. 1.
Figure 7:
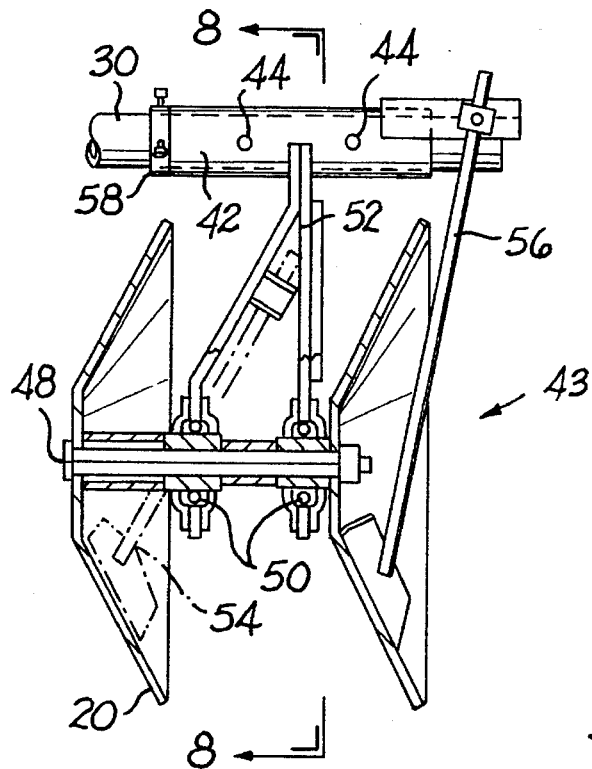
Figure 8:
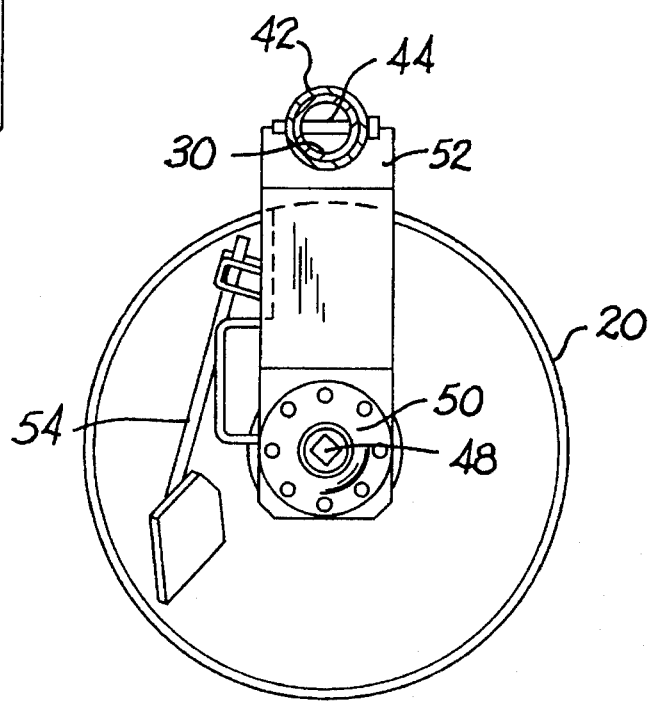
FIG. 8 is a view taken along the section 8—8 of FIG. 7.

As shown in this embodiment, the arms 26–32 are tubular. The disk pairs 16, 18, 20, 22 each are mounted on short tubular members 42, shown in more detail in FIGS. 5 and 7. Each disk unit 43 is as shown in FIG. 7, with the pair of disks mounted on an axle 48, which is mounted by bearings 50 onto a bracket 52, which is preferably welded to the short tubular member 42. A pair of scrapers 54, 56 is also mounted on the disk unit 43. The first scraper 54 is mounted on the bracket 52, and the second scraper 56 is mounted on the tubular member 42. These scrapers 54, 56 scrape dirt off of their respective disks.

Figure 9:
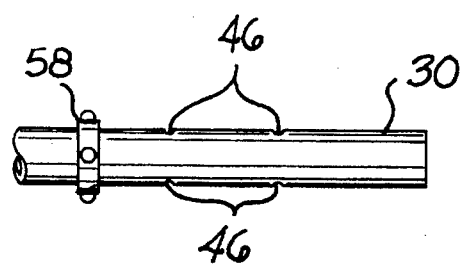
FIG. 9 is a top view of the arm of FIG. 8, with the disks removed from the arm.

The tubular members 42 have an inside diameter that has a sliding fit over the outside diameter of the respective arm on which the disk pair is mounted. So, to mount a pair of disks on its respective arm, the short tubular member 42 is slid over the end of the respective arm 26, 28, 30 or 32, until it abuts a stop 58 mounted on the respective arm, as shown in FIG. 9. Then, the tubular member 42 is pinned onto its respective arm by means of pins 44, which project through aligned holes 46 in the respective arm and tubular member 42. If the farmer wishes to move the disk pairs farther apart or closer together, the stops 58 can be moved along their respective arms by unthreading the screws that hold them in place, sliding them along the arms, and then tightening the screws to hold the stops 58 in their new positions. Then, the holes 46 would have to be drilled at a new location, in order to adjust the effective width of the tool.

Since the axis of the axle 48 of the disk unit 43 is parallel to the axis of the short tubular member 42 of that unit 43, the axis of rotation of the respective pair of disks 16, 18, 20, 22 is parallel to the axis of the respective arm 26, 28, 30, 32 on which the disks are mounted, so that the left forward disks 16 have an axis of rotation which is at a forward angle alpha, the left rear disks 18 have an axis of rotation which is at a rearward angle beta, the right forward disks 20 have an axis of rotation at a forward angle alpha to the frame 12, and the right rear disks 22 have an axis of rotation at a rearward angle beta to the frame 12.

These angles of rotation are important, because they determine the direction in which the disks will throw the dirt as the tool 10 is pulled forward. It should also be noted that the disks are dish-shaped, and, in the forward disks 16, 20, the dishes open outwardly, while, in the rear disks 18, 22, the dishes open inwardly. The disks mounted as shown in FIG. 3 function so that the forward disks 16, 20 throw dirt outwardly, away from the frame 12, with the left front disks 16 throwing dirt out to the left, and the right front disks 20 throwing dirt out to the right. The rear disks 18, 22, which lie behind their respective forward disks, throw dirt inwardly, toward the center of the frame. These disks thus form a furrow, which follows the location of the tractor tires (not shown).

Returning now to FIGS. 1 and 3, the arms 26, 28, 30, 32 are mounted onto the frame 12 by being pinned at the center of the frame 12 and then extending through openings 60 in the frame.

At the back of the frame 12 are a left rear extension 62, a center rear extension 64, and a right rear extension 66. These extensions are connected together by a cross-member 68, which is hinged to the back 36 of the frame 12 as shown in FIG. 4.

Also mounted on the rear of the frame 12 are a left boom 70 a center boom 72, and a right boom 74. The left and right booms 70, 74 are each pinned at their forward end 75 to the frame 12. Approximately midway along each of the left and right booms 70, 74 is a support made up of a vertical rod 76 welded to the back of the frame 12 and a tube 78 welded onto the boom and projecting downwardly from the boom 70, 74. When the booms are installed on the frame 12, the tubes 78 extend down over the rods 76. Since the booms are pinned to the frame at their forward end 75 and are at an angle to the vertical rod 76 and tube 78, they cannot move relative to the frame, because the pin 75 limits the movement to a pivoting motion about the pin, and the rod and tube would bind and prevent such pivoting motion. The only way to move the left and right booms 70, 74 relative to the frame 12 is to remove the pins 75 first and then lift the tubes 78 off of their rods 76.

At the back ends of the left and right booms 70, 74 are shock absorbers 80, which are connected at their top ends to their respective booms 70, 74 and at their bottom ends to their respective rear extensions 62, 66. Since the top end of each shock absorber 80 is fixed, these shock absorbers exert a downward force to prevent the extensions from bouncing. On the booms 70, 74, adjacent to the shock absorbers 80 are hooks 81, the function of which will be described later.

The center boom 72 is pinned to the frame 12 at its forward end, is held up by a hydraulic jack 82, and, at its back end, is connected to the center extension 64 by a chain 84.

Attached to the back ends of the left, center and rear extensions 62, 64, 66 is a shaper 24, which includes a downwardly-extending wall 88 defining a contour 90 along its lower edge. The lower edge of the wall 88 forms an arched opening to shape and form a mound of dirt. Two heavy weights 92 are welded onto the shaper 24. These weights serve as another means, in addition to the shock absorbers 80, to prevent the shaper from bouncing. At the forward bottom edges of the shaper 24 are feet 94, which ride along at ground level as the tractor pulls the tool 10 forward.

Figure 2:
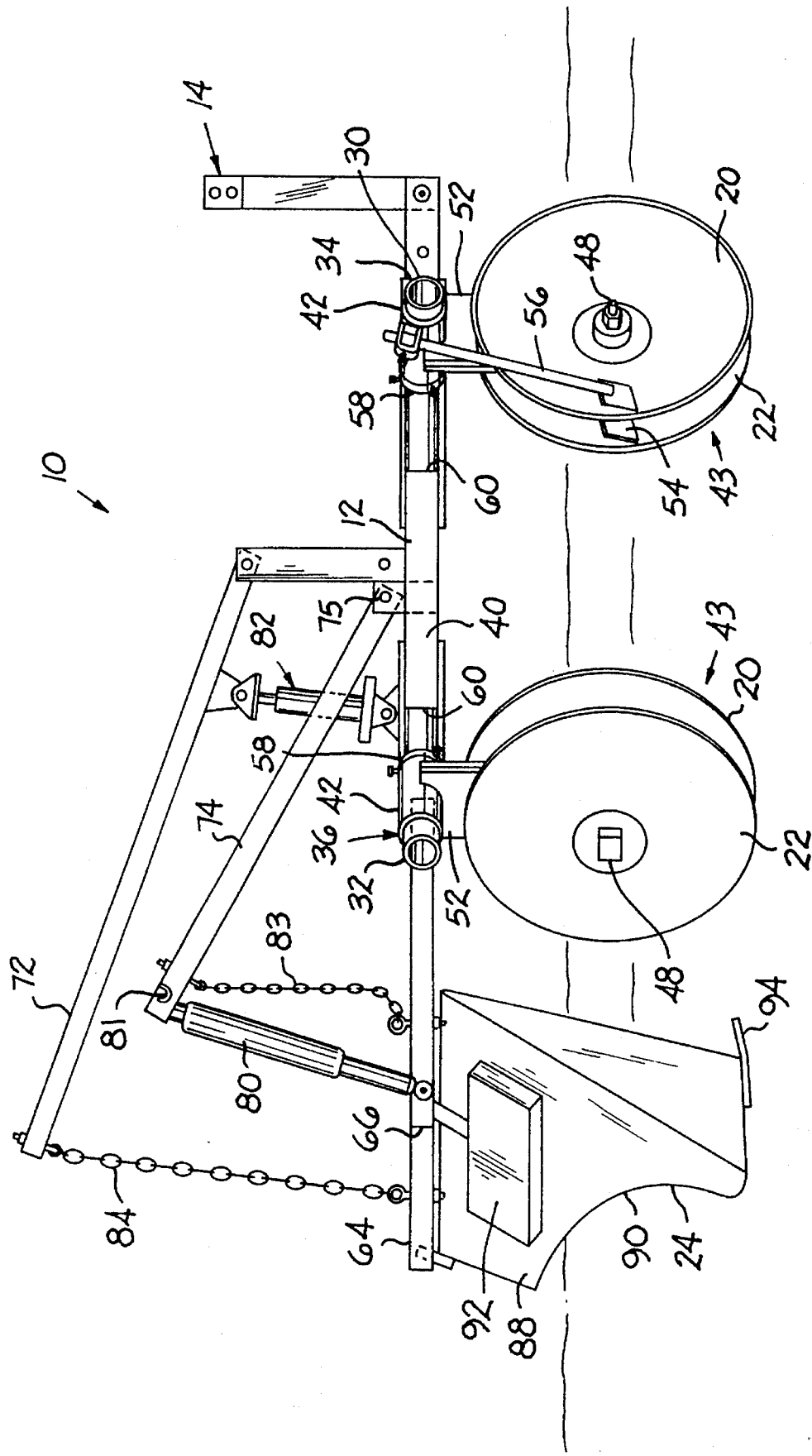
FIG. 2 is a side view thereof.
Figure 10:
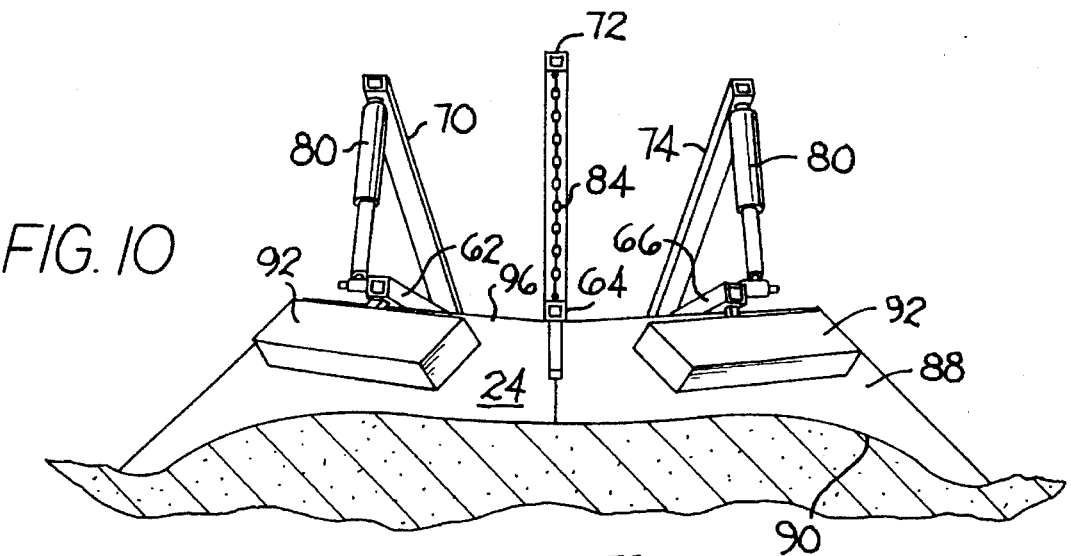
FIG. 10 is a rear view of the tool of FIG. 1, with the shaper lowered to form a mound with an indentation in its top surface.
Figure 11:
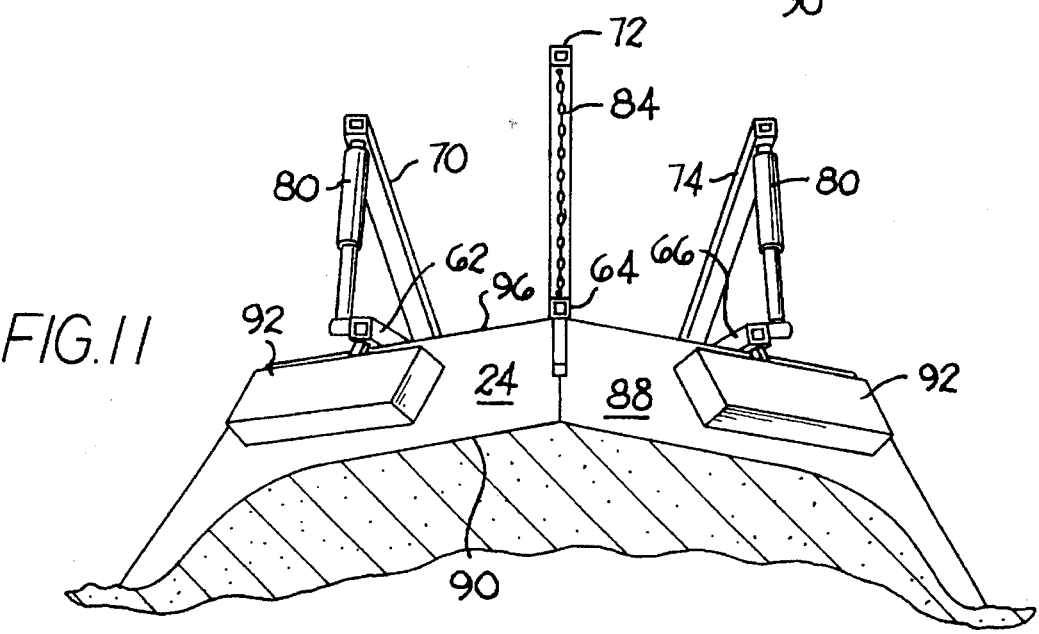
FIG. 11 is the same view as FIG. 10, but with the shaper raised to form a crowned mound.

Looking at the side view of the tool 10, as shown in FIG. 2, it can be seen that, if the tractor raises its three-point hitch, raising the frame 12, and the feet 94 remain at ground level, this will cause the extensions 62, 64, 66 to pivot downwardly, lowering the contoured edge 90 of the shaper 24 relative to ground level, thereby lowering the crown that is formed by the shaper 24, as shown in FIG. 10. If the frame 12 is lifted enough, the shaper 24 will actually form a trough in the top of the mound. Similarly, if the tractor lowers its three-point hitch, lowering the frame 12, the feet 94 of the shaper 24 will remain at ground level, and the extensions 62, 64, 66 will pivot upwardly, causing the contoured edge 90 of the shaper to move upwardly relative to ground level, resulting in a higher crown on the mound formed by the shaper, as shown in FIG. 11.

Figure 12:
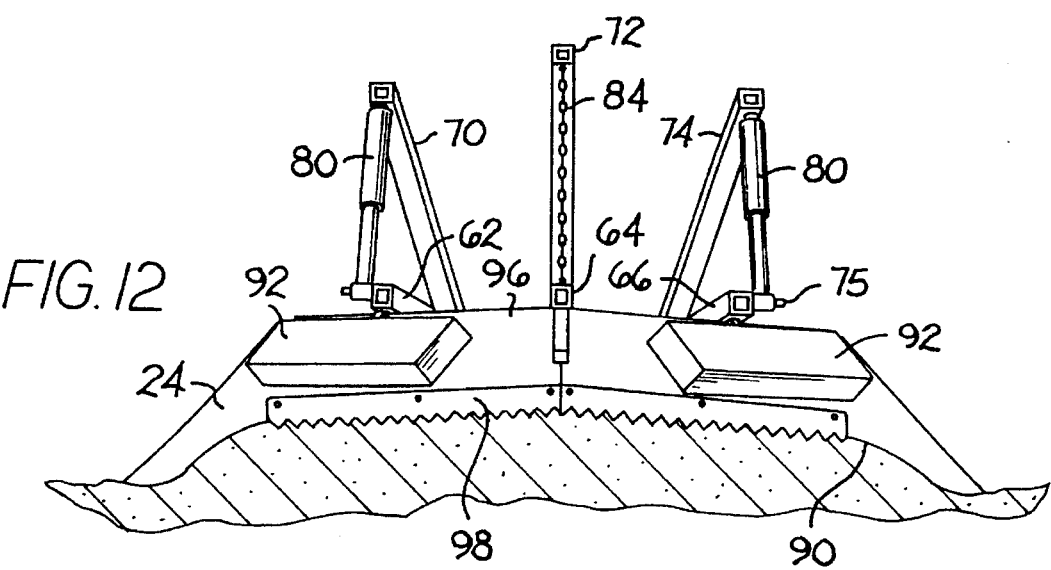
FIG. 12 is the same view as FIG. 11, but with a groove-forming tool attached to the shaper.

FIG. 12 shows the shaper in the same position as in FIG. 10, but with a grooved attachment 98 added to the contoured edge 90 of the shaper to form grooves in the bed for planting seeds, and so forth. All the shapes of mounds formed by the tool, from a mound with a high crown, as shown in FIG. 11, to a mound with a trough as shown in FIG. 10, to a mound with a grooved top, as shown in FIG. 12 are referred to as having arc-like shapes.

In operation, the tool 10 described above functions as follows. First, when taking the tool 10 to the field in which it is to be used, the jack 82 is jacked up, lifting up the center boom 72, which lifts up the back ends of the extensions 62, 64, 66, thereby lifting up the shaper 24, so it does not come into contact with the ground. The chains 83 on the left and right extensions 62, 66 are manually lifted up and hooked over the hooks 81 on the left and right booms 70, 74 respectively, to take the load off of the shock absorbers 80 and to take some of the load off of the jack 82 and put it onto the booms 70, 74. This prevents damage to the jack 82 and shock absorbers 80 as the tool is being driven out into the field. Also, the tractor will lift the three point hitch 14, lifting the entire tool 10 up off of the ground.

Figure 13:
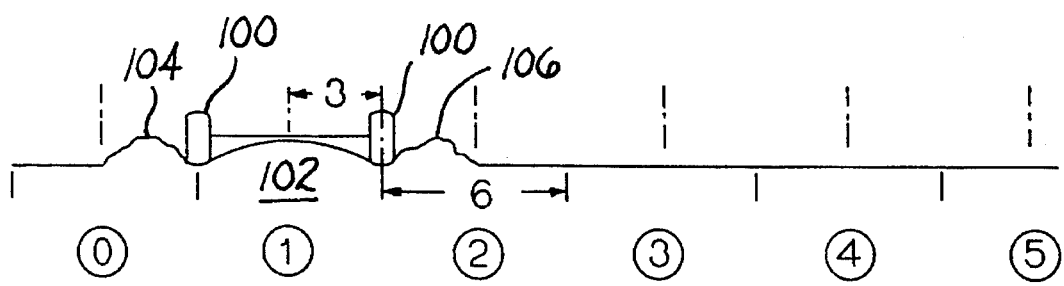
FIG. 13 is a schematic rear view of a tractor pulling the tool of FIG. 1 along a field.
Figure 14:
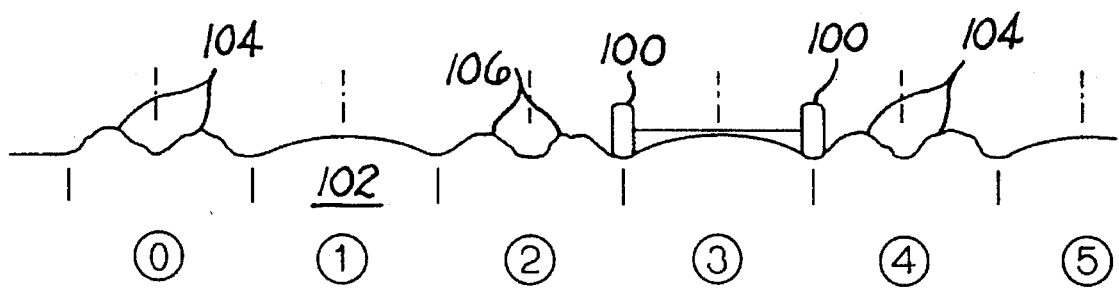
FIG. 14 is the same view as FIG. 13, after the tractor has made a single pass along the odd-numbered rows.
Figure 15:
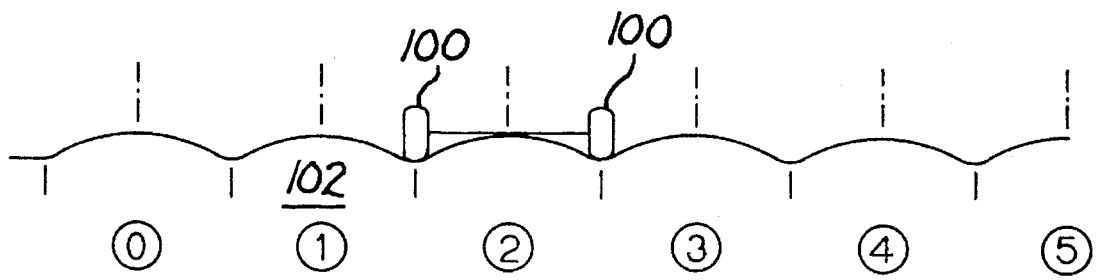
FIG. 15 is the same view as FIG. 13, after the tractor has come back and shaped the even-numbered rows.

When the tractor reaches the field where it is to form the raised beds, the chains 83 are released from the hooks 81, the jack is lowered back down, and the three point hitch 14 is lowered. The field is preferably marked off in 12-foot increments, so that raised beds can be formed on 6-foot centers. FIGS. 13–15 show schematically how the tool is used for forming the raised beds.

Looking first at FIG. 13, the tractor is lined up with the first mark. As the tractor travels forward, pulling the tool behind it, the forward disks 16, 20 take dirt from where the tractor tires 100 just drove and throw that dirt outwardly, making a half pile of dirt 104 to the left and a half pile of dirt 106 to the right. The rear disks 18, 22 take dirt from approximately the same location, behind the tractor tires, and throw the dirt toward the center of the tool 12, making a pile of dirt 102 between the left and right disks.

When the tractor reaches the end of the field at the first mark, it moves over to the second mark, twelve feet away (position #3 in FIG. 14), and comes back in the other direction, again forming and shaping a raised bed between where the tractor tires travel and throwing half a mound of dirt to the left and right. The tractor continues in this manner, forming and shaping beds at twelve-foot intervals and forming unshaped mounds of dirt centered between those twelve-foot marks (as shown at the positions 0, 2, and 4 of FIG. 14).

Figure 6:
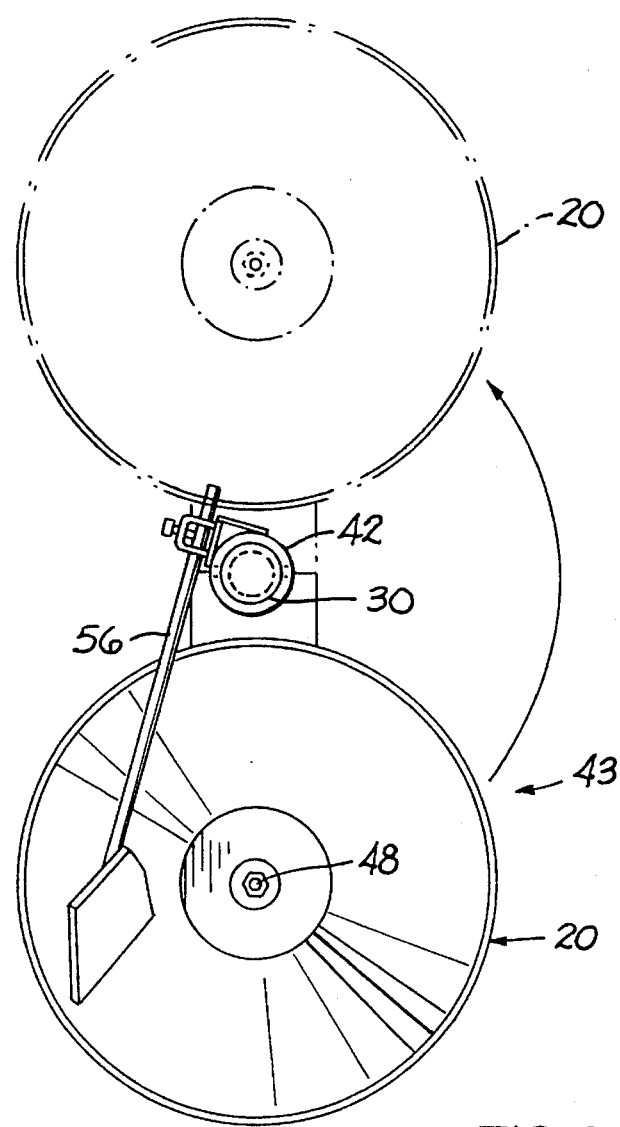
FIG. 6 is a side view of the disks of FIG. 5, with the disks shown pivoted upwardly in phantom.

When that step of the process has been completed, the farmer then removes the pins 44 on the front tubular members 42 (shown in FIG. 7), pivots the front disks 16, 20 180° until they are directed upwardly, to the position shown in phantom in FIG. 6, and puts the pins 44 back in so as to hold the front disks 16, 20 in an upright, non-functioning position. This is done because, at this point, the farmer no longer wants to be throwing dirt outwardly, away from the tool, which is the function performed by the front disks.

Then, as shown in FIG. 15, the tractor travels up and down the field along the even-numbered positions, forming the raised beds in those positions, so that, after travelling once along each row, all the raised beds are formed.

It will be obvious to those skilled in the art that modifications may be made to the embodiment described above without departing from the scope of the present invention.

What is claimed is:

1. A tool for making raised beds in the earth, comprising:
   a frame, defining a front, a back, and left and right sides;
   a first forward disk mounted on said frame at an angle so as to throw earth to one side as the tool is pulled forward;
   a second forward disk mounted on said frame, said first and second forward disks being mounted on the left and right sides of said tool, respectively;
   a first rear disk mounted on said frame behind said first forward disk, said first rear disk being mounted at an angle so as to throw earth to the side opposite to the one side as said tool is pulled forward;
   a second rear disk mounted on said frame, said first and second rear disks being mounted on the left and right sides of said tool, respectively, with said second rear disk being mounted behind said second forward disk;
   with the respective first forward disk and first rear disk forming a first trough and the second forward disk and second rear disk forming a second trough as the tool is pulled forward; such that, after the tool passes over, the earth is formed in a pattern comprising:
   a center mound formed behind the center of the tool;
   a left mound to the left of the center mound; and
   a right mound to the right of the center mound.

2. A tool for making raised beds as recited in claim 1, and further comprising:
   a shaper mounted on said frame behind said disks, so as to shape the mound of dirt formed toward the center of said tool into an arc-like shape as said tool is moved forward.

3. A tool for making raised beds as recited in claim 1, and further comprising:
   at least four cylindrical members projecting from said frame;
   at least four tubular members each mounted over its respective cylindrical member, wherein each of said disks is mounted on one of said tubular members, such that, by sliding the tubular members along their respective cylindrical members, the spacing between the left and right disks can be adjusted.

4. A tool for making raised beds as recited in claim 3, wherein said disks are fixed to their respective tubular members and said tubular members are pinned to their respective cylindrical members so that, in order to remove said disks from operation, the pins can be removed, the tubular members can be pivoted 180° about the cylindrical members on which they are mounted, and the pins can be replaced to hold the disks up, out of the ground, so they do not function.

5. A tool for making raised beds, comprising:
   a frame, defining forward, rear, left and right directions;
   forward and rear left arms and forward and rear right arms extending outwardly from said frame, said forward arms extending at a forward angle and said rearward arms extending at a rearward angle;
   left and right forward disks and left and right rear disks mounted on their respective arms, each of said disks being mounted so as to pivot about an axis substantially parallel to the axis of its respective arm, so that said forward left disk makes a pile of dirt to its left, said forward right disk makes a pile of dirt to its right, and said rear disks make a pile of dirt between them, as said tool is moved forward; and
   a shaper mounted on said frame behind said rear disks for shaping the pile of dirt formed between the rear disks into a center mound as said tool is moved forward.

6. A tool for making raised beds as recited in claim 5, wherein said shaper includes a downwardly-extending wall having a lower edge, defining an arched opening which shapes the center mound of dirt.

7. A tool for making raised beds as recited in claim 6, wherein said shaper is pivotably mounted on and adjustable relative to said frame, and whereby, when said frame is shifted downwardly, said shaper pivots upwardly, to form a crowned mound, and, when said frame is shifted upwardly, said shaper pivots downwardly, to form a mound with less of a crown.

8. A tool for making raised beds, comprising:
   a frame, defining forward, rear, left and right directions;
   forward and rear left arms and forward and rear right arms extending outwardly from said frame, said forward arms extending at a forward angel and said rearward arms extending at a rearward angle; and
   left and right forward disks and left and right rear disks mounted on their respective arms, each of said disks being mounted so as to pivot about an axis subatantially parallel to the axis of its respective arm, so that said forward left disk makes a pile of dirt to its left, said forward right disk makes a pile of dirt to its right, and said rear disks make a pile of dirt between them, as said tool is moved forward, wherein said arms are cylindrical, and said disks are mounted on tubular members which can slide along said cylindrical arms in order to adjust the left-to-right spacing of said disks.

9. A method of making raised beds, comprising the steps of:
   pulling a tool forward over the ground behind a tractor to form a mound of dirt between the tractor tires and half-mounds of dirt to the left and right of the tractor and shaping the mound of dirt between the tractor tires into an arc-like shape.

10. A method of making raised beds as recited in claim 9, and further comprising the steps of:
    going up and down the field with the tractor spaced from the previously formed mound, so as to form other mounds and shape other mounds adjacent to a previously formed half-mound;
    then retracting the portions of said tool which throw dirt to the left and right of the tractor and going back over the half of the mounds that have not yet been shaped in order to shape them into mounds.

11. A tool for making raised beds, comprising:
    a frame, defining forward, rear, left and right directions;
    a plurality of disks mounted on said frame so as to form a center mound, a left mound, and a right mound as said tool is pulled forward; and
    a shaper mounted on said frame behind said disks; said shaper including a downwardly-extending wall having a lower edge, defining an arched opening which shapes the center mound of dirt formed as said tool is pulled forward.

* * * * *